W. W. STEPHENS.
CARRIER FOR BELT CONVEYERS.
APPLICATION FILED DEC. 4, 1911. RENEWED NOV. 12, 1917.
1,255,658.
Patented Feb. 5, 1918.
2 SHEETS—SHEET 1.
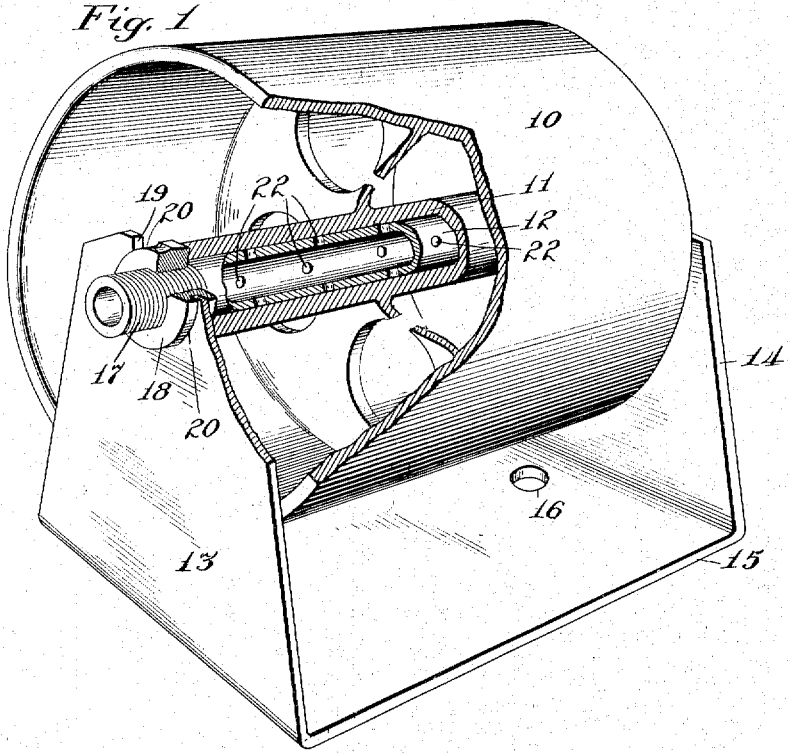
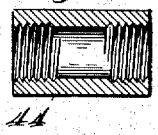
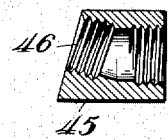
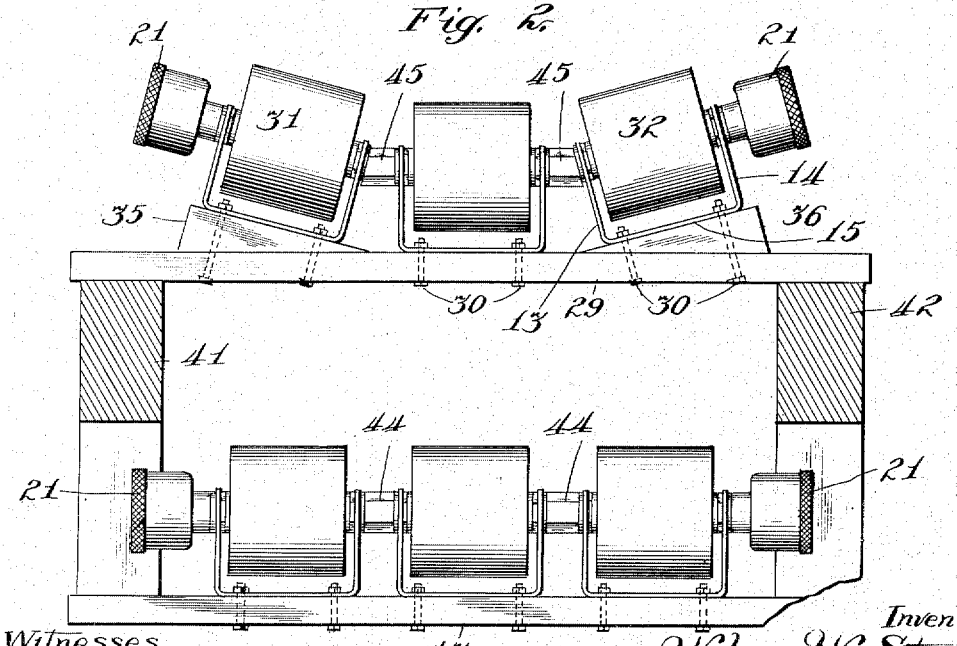
Witnesses
Inventor
Wiley W. Stephens.
Attorneys.

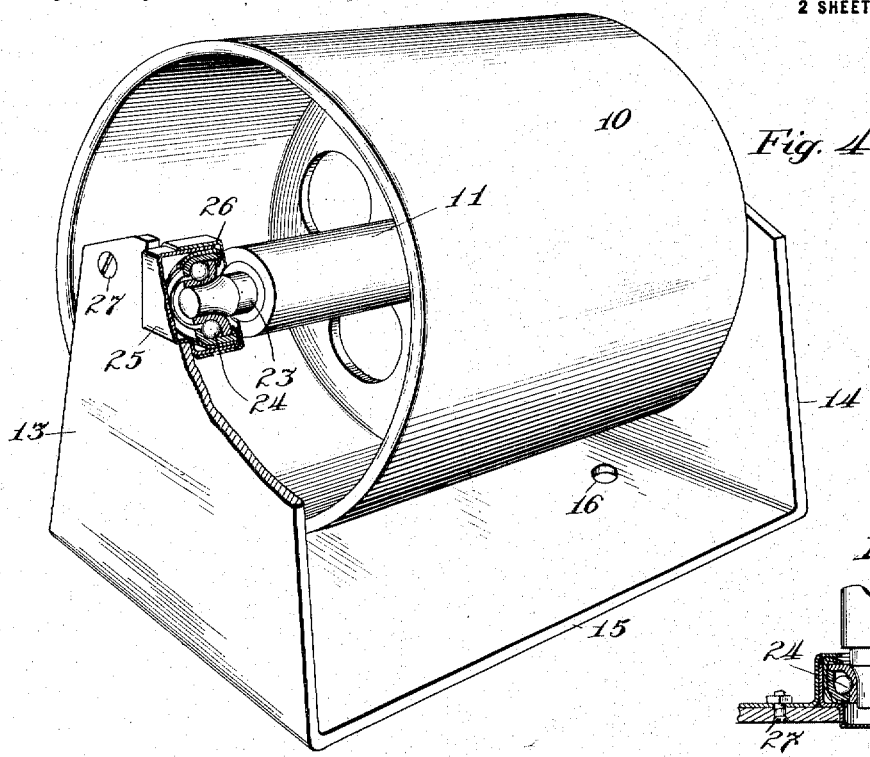
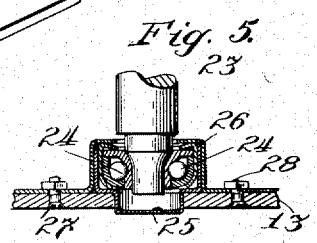
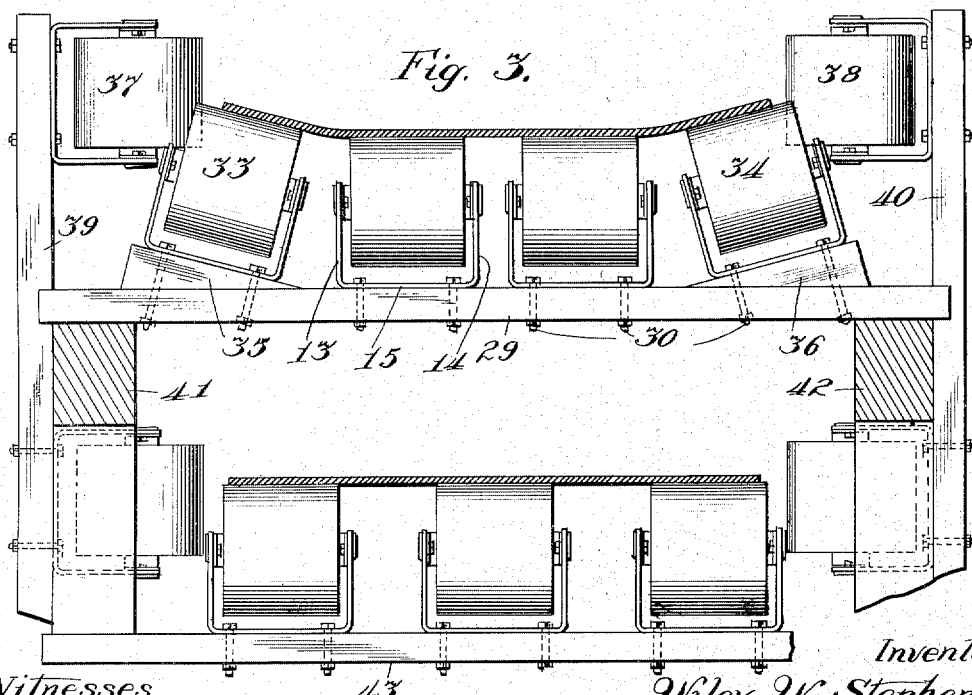

UNITED STATES PATENT OFFICE.

WILEY W. STEPHENS, OF AURORA, ILLINOIS, ASSIGNOR TO STEPHENS-ADAMSON MFG. CO., A CORPORATION OF ILLINOIS.

CARRIER FOR BELT CONVEYERS.

1,255,658.      Specification of Letters Patent.      Patented Feb. 5, 1918.

Application filed December 4, 1911, Serial No. 663,954. Renewed November 12, 1917. Serial No. 201,658.

*To all whom it may concern:*

Be it known that I, WILEY W. STEPHENS, a citizen of the United States, and resident of Aurora, county of Kane, and State of Illinois, have invented certain new and useful Improvements in Carriers for Belt Conveyers, of which the following is a specification, and which are illustrated in the accompanying drawings, forming a part thereof.

The invention relates to rollers for carrying endless belts used in conveying material, such as grain, coal, ore, gravel, etc.

The unit in rollers for belt conveyers as heretofore constructed has consisted of a plurality of rollers mounted upon a common support, the troughing and guide rollers usually being mounted upon a bracket integral with the support for the carrying rollers or upon a special form of independent support. The dimensions of such units has necessarily been governed by the width of the belt to be employed or the cross-sectional configuration desired to give the belt in carrying its load.

One of the objects of the present invention is to provide a roller and supporting bracket therefor which shall constitute a single unit, whereby sets of rollers consisting of a plurality of such units may be assembled in coöperative relation upon a suitable support, the units being adapted for service either as supporting, troughing, guide, or return rollers, whereby carriers for belts of various widths and of various cross-sectional surface configurations may be built up from such units by varying the number employed, according to the width of the belt, and by so mounting the units which are to serve for troughing or guiding the belt as to present their peripheral faces at the proper angle to adapt them to serve their intended function.

A further object of the invention is to provide suitable means for lubricating from a common receptacle a plurality of such roller units, when mounted together.

These objects are attained by journaling each roller in an individual bracket or yoke adapted for attachment to a supporting base, so that the roller may be used either for supporting, troughing, or guiding the belt and may, for these various uses, be fixed to the base at the required position, the number of unit rollers employed in a single set varying with the width of the belt; and when the rollers are revolubly mounted on tubular axles, connecting the axles of adjacent units by nipples so that the lubricant applied to one unit may serve all of the set so connected.

The invention is exemplified in the structures illustrated in the accompanying drawings, wherein—

Figure 1 is a perspective of one of the units, some of the parts being broken away;

Fig. 2 is an elevation, viewed transversely with reference to the belt, of a set of unit rollers arranged for carrying a belt, troughed as to its load-carrying stretch and flat as to its return stretch;

Fig. 3 is a view similar to Fig. 2, a set composed of unit rollers being shown differently arranged;

Fig. 4 is a perspective of one of the unit rollers, some of the parts being broken away, showing a modified form of construction;

Fig. 5 is a sectional detail of the bearing shown in Fig. 4;

Fig. 6 is a longitudinal section of a connecting nipple for uniting the axles of unit sections mounted with their axes in alinement; and Fig. 7 is a longitudinal section of a connecting nipple for uniting the axles of unit sections arranged with their axes at different inclinations.

In carrying out the invention each unit comprises a short roller mounted upon a suitable axle secured in a bracket which is adapted for attachment in any desired position to a supporting block, bar or frame. The several units are identical in size, form and construction, and may be assembled upon the support in such numbers and in such relative positions as may be required in view of the width of the belt to be carried and the surface configuration to be given it, the troughing belts being fixed at a suitable inclination, and, when used, the troughing rollers and, when required, the guide rollers being set vertically. Such units may be employed for carrying both the service stretch and the return stretch of the belt.

While the several units of each set may be arranged with their axes laterally offset, better practice requires that they be arranged in a straight line and that the ends of the rollers be in sufficiently close proximity to prevent the belt from sagging under the load and thereby causing it to break over the end of the roller. One of the features of the invention consists in so constructing the several units that they may be thus advantageously arranged.

In the construction as illustrated in Fig. 1, the unit comprises a short roller, as 10, having a tubular hub 11 which is sleeved upon a tubular axle 12, the ends of which are fixed in the side members 13, 14, of a U-shaped bracket, which may be a malleable casting or be formed of a single plate of rolled metal, and the cross-member 15 of which is adapted to be secured to a supporting base, apertures or bolt holes, as 16, being provided for this purpose.

As a convenient means for fixing the axle within the arms of the bracket, its ends may be threaded, as shown at 17, a nut 18 being applied to the threaded end and being adapted to fit into a recess 19 formed in the end of the side member, as 13, of the bracket. The nut is preferably of greater diameter than the recess 19, and is provided with a peripheral channel 20 for receiving the edges of the recess.

The axle 12 is of sufficient length to project at each end beyond the bracket, and affords means for the attachment of a grease cup 21, the axle being perforated, as shown at 22, to permit the grease to reach the inner or bearing face of the hub 11.

In the modification shown in Figs. 4 and 5, ball bearings are used, the hub 11 of the roller 10 being fixed upon an axle 23 which is journaled on a set of balls 24 mounted in a suitable race housed within the casing, comprising a cup 25, which is set through an aperture in the side members 13 of the bracket, a cap 26 being fitted over the inner and open end of the cup 25 and secured to the bracket member in any suitable manner, as shown by means of bolts 27, 28.

In assembling the unit rollers in sets the number employed will be determined by the width of the belt. A suitable support is provided which may consist of a single bar, as 29, to which the brackets of the several units are secured, preferably by means of bolts, as 30. When it is desired to trough the belt the outer units 31, 32 (referring to Fig. 2), or 33, 34 (referring to Fig. 3), may be set at an inclination by inserting under each a wedge-block, as 35, 36, the upper surface of which has the desired inclination, the securing bolts being passed through the cross member of the bracket, the wedge-block and the supporting bar, as shown. When guide rollers are required for limiting lateral movement of the belt, additional units, as 37, 38, may for this purpose be secured to uprights 39, 40.

The framework for carrying the supports for the several sets of units may be of any suitable form and is not herein fully shown, there being represented merely longitudinal stringers 41, 42, to which the bars 29 for supporting the rollers carrying the service stretch of the belt, and the bars, as 43, for supporting the rollers carrying the return stretch of the belt, may be secured.

The unit rollers are adapted to be arranged in a variety of forms in addition to those shown in the drawings, as many being employed in each set as the size or character of the belt and the work to be performed may demand.

When the form of construction illustrated in detail in Fig. 1 is followed, adjacent units are preferably connected together by means of nipples 44 or 45, these nipples being screwed upon the ends of the axles 17. The bore of one end of the nipple 45 is inclined to the axis of the nipple, as shown at 46, one of the rollers with which it is associated to be set at an inclination for the purpose of troughing the belt.

In Fig. 2 two sets of rollers are shown as being connected by means of nipples 44, 45, thereby providing for the lubrication of all of the rollers of each set by means of grease cups attached to the outer ends of the axles of the outer rollers.

By thus making the individual roller with the bracket within which it is mounted instead of a set of rollers permanently united, all of the units being identical in construction, it becomes necessary only for the millwright to provide himself with the requisite number of units that he construct the supporting frame and arrange the various units to meet the exigencies of any situation which may present itself. Special supports for complete sets of rollers are unnecessary.

While the troughing and supporting rollers are shown in the drawings as being axially alined, this arrangement is not essential unless it is desired to connect the axles of adjacent rollers by means of nipples as above described.

I claim as my invention—

1. A conveyer comprising, in combination, a belt, a bar extending transversely beneath the belt, such bar having its middle portion horizontal and its end portions upwardly inclined, a plurality of alined rollers for engaging the belt, a plurality of like independent U-shaped brackets the arms of each bracket embracing and rotatably supporting one of the rollers, the cross-members of such several brackets being seated upon and secured, respectively, to the horizontal and inclined portions of the bar.

2. A conveyer comprising, in combination, a belt, a frame comprising a cross-member beneath the belt and uprights at each side of the belt, a plurality of like U-shaped brackets having their cross-members seated against and secured, respectively, to the cross member and uprights of the frame, and rollers journaled between the arms of the several brackets.

3. A support for a conveying belt, having in combination, a frame element, a plurality of alined rollers for engaging the belt, each of the rollers being journaled in a separate U-shaped bracket mounted on the frame element, the axes of the end rollers being inclined and the axes of the intermediate roller or rollers being horizontal.

WILEY W. STEPHENS.

Witnesses:
C. A. KRAUSE,
E. P. CALKINS.

Copies of this patent may be obtained for five cents each, by addressing the "Commissioner of Patents, Washington, D. C."